United States Patent
Lima et al.

(10) Patent No.: US 12,343,792 B2
(45) Date of Patent: Jul. 1, 2025

(54) METHOD FOR COATING STEEL PAN BOTTOMS AND STEEL PAN BOTTOMS

(71) Applicant: Saint-Gobain do Brasil Produtos Industriais e Para Construção Ltda., Sao Paulo (BR)

(72) Inventors: Haysler Apolinário Amoroso Lima, Bragança Paulista (BR); Vladnilson Peter De Souza Ramos, Vinhedo (BR); Hamilton Cesar Guimarães, Campinas (BR)

(73) Assignee: Saint-Gobain do Brasil Produtos Industriais e Para Construção Ltda., Sao Paulo (BR)

( * ) Notice: Subject to any disclaimer, the term of this patent is extended or adjusted under 35 U.S.C. 154(b) by 253 days.

(21) Appl. No.: 17/777,059

(22) PCT Filed: Nov. 10, 2020

(86) PCT No.: PCT/BR2020/050464
§ 371 (c)(1),
(2) Date: May 16, 2022

(87) PCT Pub. No.: WO2021/092668
PCT Pub. Date: May 20, 2021

(65) Prior Publication Data
US 2022/0402022 A1    Dec. 22, 2022

(30) Foreign Application Priority Data

Nov. 14, 2019   (BR) .......................... 102019024046-6

(51) Int. Cl.
*B22D 41/02* (2006.01)
*A47J 36/02* (2006.01)
(Continued)

(52) U.S. Cl.
CPC ............ *B22D 41/023* (2013.01); *A47J 36/02* (2013.01); *B22D 41/08* (2013.01); *F27D 1/10* (2013.01); *F27D 1/16* (2013.01)

(58) Field of Classification Search
CPC ....... B22D 41/02; B22D 41/023; B22D 41/08
See application file for complete search history.

(56) References Cited

U.S. PATENT DOCUMENTS

| 4,019,847 A | 4/1977 | Imai et al. |
| 4,726,570 A | 2/1988 | Phillips et al. |

(Continued)

FOREIGN PATENT DOCUMENTS

| CN | 1206638 | 2/1999 |
| CN | 201832989 | 5/2011 |

(Continued)

OTHER PUBLICATIONS

Relatorio de Pesquisa Internacional e Opiniao Escrita [International Search Report and the Written Opinion] Dated Feb. 9, 2021 From the International Searching Authority Re. Application No. PCT/BR2020/050464 and Its Translation of Search Report Into English. (11 Pages).

(Continued)

*Primary Examiner* — Kevin E Yoon

(57) ABSTRACT

The present invention provides a method for coating the bottom of a steel pan comprising the steps of positioning a mold on the bottom of the steel pan; securing the mold by means of a clamping mechanism; applying refractory material to the bottom of the pan and below the mold; applying a load to the mold; and removing the mold from the refractory material. The present invention is advantageous because it enables an increase in the metallic yield of pans and the reduction of non-metallic inclusions, which are normally dragged by the vortex formed.

7 Claims, 6 Drawing Sheets

(51) Int. Cl.
*B22D 41/08* (2006.01)
*F27D 1/10* (2006.01)
*F27D 1/16* (2006.01)

(56) References Cited

U.S. PATENT DOCUMENTS

| | | | |
|---|---|---|---|
| 4,746,102 A | 5/1988 | Gilles et al. | |
| 4,923,180 A | 5/1990 | Eitel | |
| 5,196,051 A | 3/1993 | Heaslip et al. | |
| 8,110,142 B2 | 2/2012 | Barrett et al. | |
| 9,579,721 B2 * | 2/2017 | Richaud | B22D 43/001 |
| 9,849,508 B2 * | 12/2017 | Kohler | F27D 3/1518 |
| 2012/0126467 A1 * | 5/2012 | Barrett | F27D 1/0043 266/280 |

FOREIGN PATENT DOCUMENTS

| | | |
|---|---|---|
| CN | 102886514 | 1/2013 |
| CN | 203437636 | 2/2014 |
| CN | 106541120 | 3/2017 |
| CN | 109014162 | 12/2018 |
| EP | 0729800 | 9/1996 |
| FR | 2654661 A1 * | 5/1991 |
| GB | 889365 | 2/1962 |
| GB | 1374493 | 11/1974 |
| JP | S57129388 | 8/1982 |
| JP | 58-103957 | 6/1983 |
| JP | S62-179863 | 8/1987 |
| JP | H02-127963 | 5/1990 |
| JP | H04-4966 | 1/1992 |
| JP | 2002-500956 | 1/2002 |
| WO | WO-9937423 A1 * | 7/1999 ........... B22D 41/003 |
| WO | WO 02/04381 | 1/2002 |
| WO | WO 2003//072285 | 9/2003 |
| WO | WO 2013/043257 | 3/2013 |

OTHER PUBLICATIONS

Supplementary European Search Report and the European Search Opinion Dated May 3, 2023 From the European Patent Office Re. Application No. 20886227.6. (12 Pages).

Translation of Notification of Office Action and Search Report Dated May 23, 2024 From the State Intellectual Property Office of the People's Republic of China Re. Application No. 202080079466.9. (9 Pages).

Translation of Notification of Office Action Dated Nov. 8, 2024 From the State Intellectual Property Office of the People's Republic of China Re. Application No. 202080079466.9. (4 Pages).

Request for the Submission of An Opinion Dated Mar. 31, 2025 From the Korean Intellectual Property Office Re. Application No. 10-2022-7019274 and Its Translation Into English. (13 Pages).

* cited by examiner

METHOD FOR COATING STEEL PAN BOTTOMS AND STEEL PAN BOTTOMS

RELATED APPLICATIONS

This application is a National Phase of PCT Patent Application No. PCT/BR2020/050464 having International filing date of Nov. 10, 2020, which claims the benefit of priority of Brazil Patent Application No. BR 10 2019 024046-6 filed on Nov. 14, 2019. The contents of the above applications are all incorporated by reference as if fully set forth herein in their entirety.

FIELD AND BACKGROUND OF THE INVENTION

The present invention refers to a method for coating steel pan with concrete refractory material through the use of a mold to attach to the bottom of the pan, allowing the induction of characteristic flow lines to improve the flow, providing a high rate of depletion of steel and reduction of phenomena linked to vortex and drain reducing the passage of slag. Thus, an increase in the metallic yield of pans becomes possible as well as the reduction of non-metallic inclusions that are normally entrained by the vortex formed.

During the steelmaking process, liquid metal is poured from the converter into a steel pan. As illustrated in FIG. 1, the pan is a piece of equipment consisting of a metal casing 1, internally lined with refractories to withstand high temperatures coming from the liquid steel. The bottom of the pan 5, composed of refractory bricks, has a region for the incidence of the steel jet (impact), usually with a greater thickness to withstand wear, another region containing a refractory piece with a porous plug for injection of argon to optimize the metallurgical process and another region composed of flow control system 2, containing a gate valve that controls the passage of steel. The gate valve is composed of two flat plates, containing a hole, which aligned allow the passage of steel.

In addition, the pan undergoes metallurgical treatments for chemical and thermal adjustment of the steel. Then the pan is attached to the caster tower and the gate valve is opened to allow the steel to flow into the distributor. Due to the irregular shape of the pan bottom, part of the steel is retained when emptying, which does not allow all the liquid steel to flow out of the pan. In this way, the metallic yield is reduced, since this retained steel becomes scrap, which will be reprocessed. This problem implies costs related to energy and time expenditure.

Another problem that occurs during the pan flow is vortex formation, which increases casting time and allows slag to pass into the distributor. There is also the formation of the drain phenomenon, at the end of the casting. The drain causes the slag in the final minutes of the flow process to collapse, preventing the rest of the steel from flowing.

In view of this, the need arises for the development of technologies that allow better flow of steel, ensuring better metal yielding, reduced rework, and improved steel quality (inclusions).

Several techniques have emerged over the years to contain part of this fluid dynamic problem. Among the various proposals we can highlight the best known, one being the staggered assembly of bricks. This solution consists of having steps along the bottom of the pan, with the steel from the melting furnace falling at a higher height, and the gate valve region being the deepest. However, this solution, which is applied in most projects, only partially improves the problem, but is not very efficient, because about 1 to 4% of the steel is still retained.

Another common solution adopted in some steel mills is to tilt the pan during casting. This inclination, allows much more exhaustion of the liquid steel, increasing the height of the metal column, avoiding some of the suction of supernatant slag. This solution is not very safe, as you need to tilt the pan using a metal shim, and it also hinders the handling of the long tube that directs the liquid steel to the distributor.

Documents PI 0307454-4 and WO2003072285A1 propose a new solution to reduce metal trapped in the bottom of the pan, and the reduction of slag passage through the gate valve system. The solution consists of terraces with different levels of the gate valve that is at the lowest part of the pan. These terraces are described as horizontal, which have the function of retaining part of the supernatant slag. Below the terraces, we have sloped bottoms, which allow the column of liquid metal to rise, making it flow preferentially to the gate valve. The place above the gate, called the sump, would serve as a liquid metal reservoir, increasing the residence time of the metal in the region, avoiding the dragging of slag. The same solution may also contain a set of several chamfers, which are described as recesses. This type of solution is also described in the document U.S. Pat. No. 5,196,051. In this way, the formation of the vortex would be prevented. However, these documents show no fluid dynamic studies to support this claim.

Document U.S. Pat. No. 4,746,102 proposes another type of pan bottom, consisting basically of a sloping ramp to the gate valve location. This solution allows a lot of liquid metal to be exhausted, however, it does not guarantee a reduction in the slag passage during pouring, due to the drag (vortex) and drain effect.

The state of the technique documents do not describe in detail the manufacturing process for these backgrounds, which indicates that the known solutions consist of prefabricated parts that are fitted at the installation site.

The technologies already known by the state of the technique claim to be able to increase the metal yield or even reduce the slag passage, but do not present scientifically (water or numerical models) how this can occur. Simply empirical proposals, based on the interpretation of the phenomena involved. In other words, such a solution would need more results to guarantee such improvements.

Therefore, the state of the technique lacks a solution that can provide a steel pan bottom coating that can improve the steelmaking process and that is practical to install and can be performed at the operation site. Furthermore, the state of the technique does not present a solution that can provide a pot bottom coating that has the same characteristic profile for its entire lifespan.

SUMMARY OF THE INVENTION

It is a purpose of the present invention to provide a method for the development of a monolithic pan bottom coating (refractory concrete), through the use of a metallic mold, with a characteristic profile, aiming to improve the flow of the liquid steel, allowing greater exhaustion of the steel and reducing the passage of slag.

It is a further purpose of the present invention to develop a coating comprising inclined channels, connecting the end points of the pan, directing the flow smoothly into the gate valve system. The slope of the channels can be formed into curved or straight profiles. The slope of the channels allows for the acceleration of the steel flow that assists in sustaining the slag at the gate valve location and part of the vortex breakdown.

Furthermore, it is a purpose of the present invention to also propose the construction during concrete casting on site, barriers close to the gate valve system. These barriers have the function of breaking the circular motion characteristic of the vortex. These barriers here are called chamfers, which are made during concreting, or made precast and inserted on site.

In order to achieve the above purposes, the present invention provides a method for coating the steel pan bottom comprising the steps of positioning a mold on the bottom of the steel pan; securing the mold by means of a clamping mechanism; applying refractory material to the steel pan bottom and below the mold; applying a load to the mold; and removing the mold from the refractory material.

DESCRIPTION OF SPECIFIC EMBODIMENTS OF THE INVENTION

The following description will start from preferred embodiments of the invention, applied to a steel pan bottom. However, as will be evident to one skilled in the technique, the invention is not limited to any particular modality, nor is it limited to a specific steel pan coating method.

Figure 1:
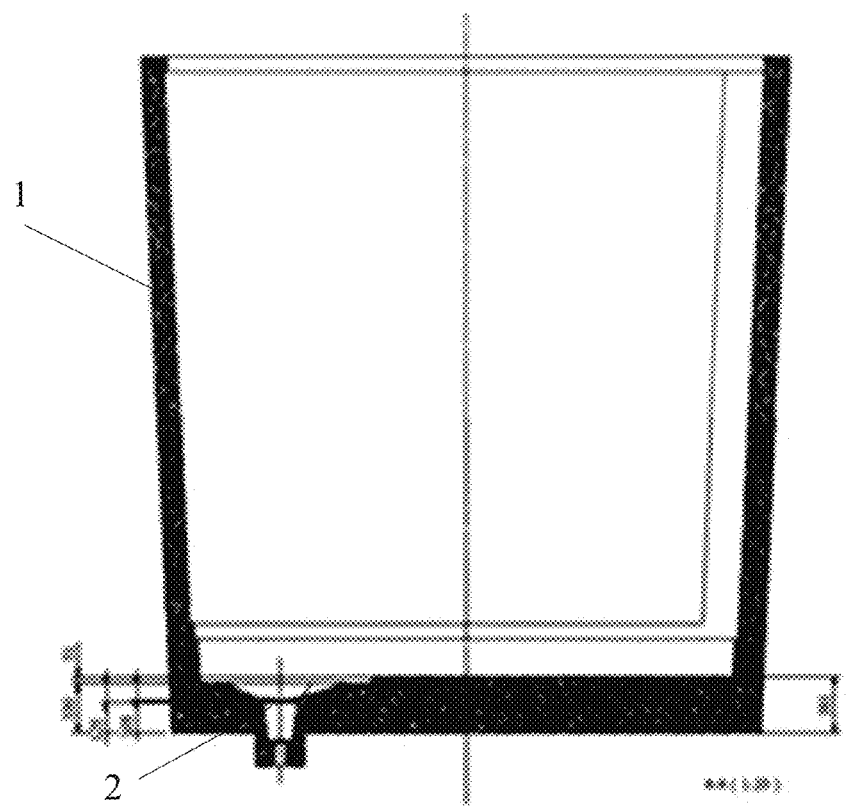
FIG. 1 illustrates a cross section of a steel pan.

As already mentioned, FIG. 1 shows an illustration of a steel pan used during the steelmaking process. The pan comprises a pan bottom 1 that is made of refractory material. Additionally, the pan comprises a valve seat 2 that is formed as a gate valve that allows the steel to flow.

In general, the pan bottom has a location that receives the steel jet from the converter having the thickest refractory and thus located at the highest point of the pan bottom. From this location, the liquid steel spreads to the rest of the pan until the level rises. However, in some regions of the pan not enough steel flow occurs. In order to solve this problem, a coating background is proposed to improve steel exhaustion.

Figure 2:
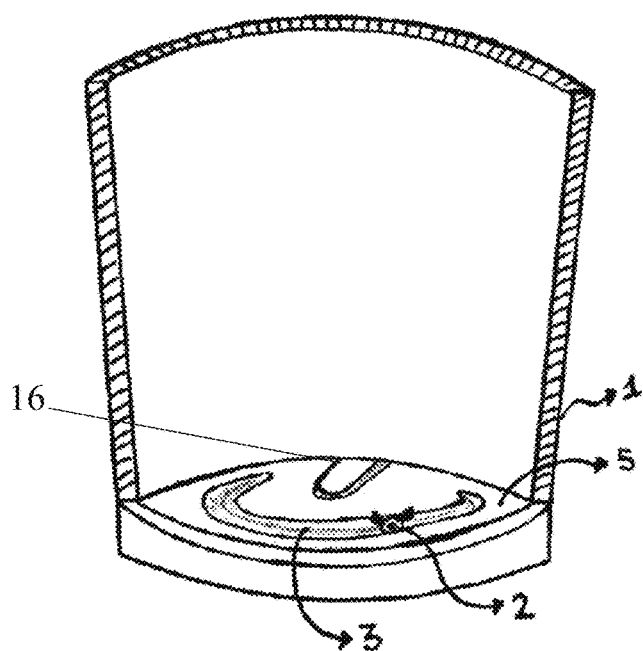
FIG. 2 shows a sectional view of a steel pan with a pan bottom according to a modality of the present invention.

FIG. 2 illustrates a first modality of steel pan bottom coating according to the present invention applied to a steel pan comprising an impact region 16 and a valve seat 2. The pan bottom coating according to the present invention has a printed characteristic profile that is determined so as to form characteristic flow channels that are formed due to the thickness variation of the profile extending from a region of greater thickness to a region of lesser thickness of the pan bottom.

In this modality, where the pan bottom comprises only an impact piece 16 and a valve seat 2, the mold has a C-shape, wherein an end projects from a point adjacent to a side of the impact region 16 in the region of greater thickness in a substantially circular fashion over the pan bottom, through the valve seat 2 in the region of lesser thickness, to a point adjacent to the opposite side of the impact region 16 in the region of greater thickness. This format allows the dead zones near the impact region 16 in the region of greater thickness to be interconnected to the outlet valve in the region of lesser thickness.

Depending on the arrangement of the gate valve with respect to the other regions of the pan, the shape of the profile can vary, in order to optimize as much as possible and eliminate dead zones that could store steel in the pan.

The printed profile should eventually have a different characteristic shape to improve the flow depending on the type of pan used. For example, the pan may have a second outlet valve region, through which the steel will leak into the casting. Some pans may also have a porous plug that is commonly used for inert gas injection to improve steel refining.

Thus, it was found that the mold should ideally occupy or cover as much of the bottom of the pan as possible (with the exception of the impact region). This ensures the greatest coverage of the dead zones, allowing the capture of metallic steel that would not be converted through the valve seat. In this way, the mold generates depressions interconnecting the points in common with the gate valve region.

Figure 3:
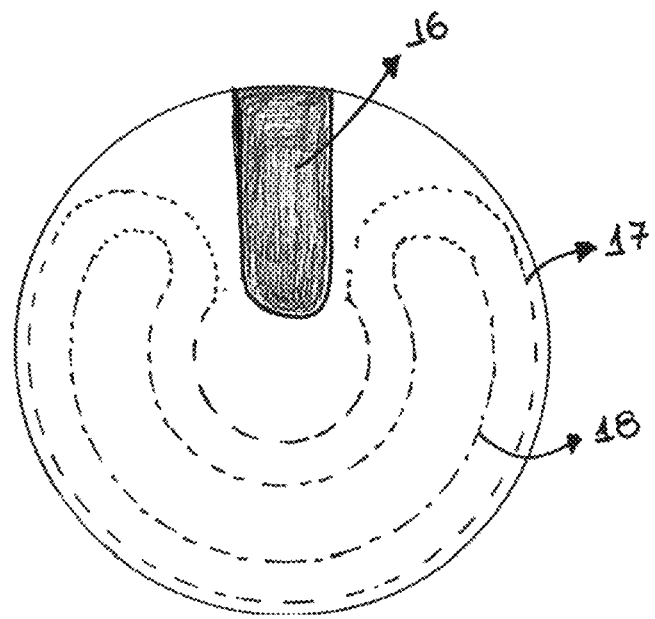
FIG. 3 illustrates the profile regions of different configurations according to the present invention.

FIG. 3 illustrates the regions of the pan bottom that can be occupied by the profile having different configurations in consideration of the position of the impact region 16, the valve seat 2 and the porous plug 19. Considering the different configurations of the pan bottom, two important regions can be considered, the useful improvement region 17, which will be the place where the new profile for flow improvement will be positioned, being the point farthest from the valve seat 2 the zero point, from which the bottom thickness decreases until the seat, generating a region of greater depth. Another highlighted region would be the critical region 18, representing the region where valve seat 2 and porous plug 19 may be located.

In the case where the pan does not have a porous plug 19 the final design is straightforward, i.e. you interconnect the distant points with valve seat 2 with a C-shaped profile as in FIG. 2.

Figure 4:
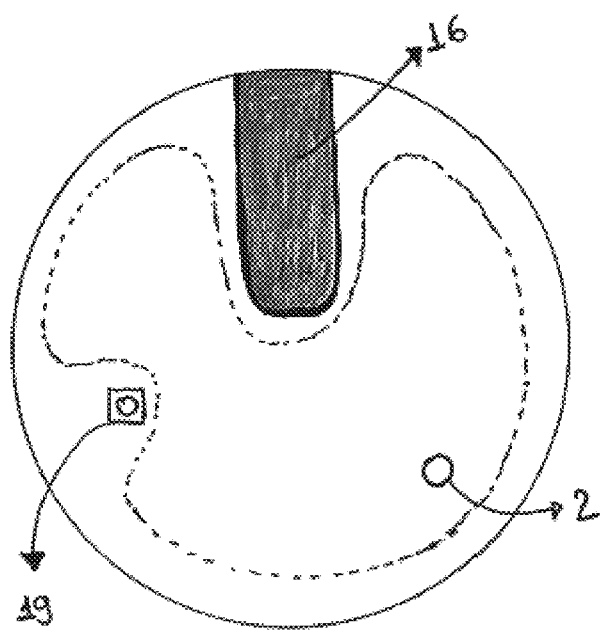
FIG. 4 shows another modality of the steel pan bottom coating according to the present invention.

In the case where the bottom of the pan has a porous plug, the profile needs to be adapted in such a way as to prevent the characteristic path from passing over the porous plug. FIG. 4 illustrates a mode of the invention that is used in the case where the pan bottom has a plug 19 between the profile endpoints, and thus it is necessary to apply an offset around the plug 19. In other words, the characteristic profile used in the mold must have the ability to form characteristic curves that bypass the porous plug 19 keeping it in the region of greater thickness at the bottom of the pan.

Figure 5:
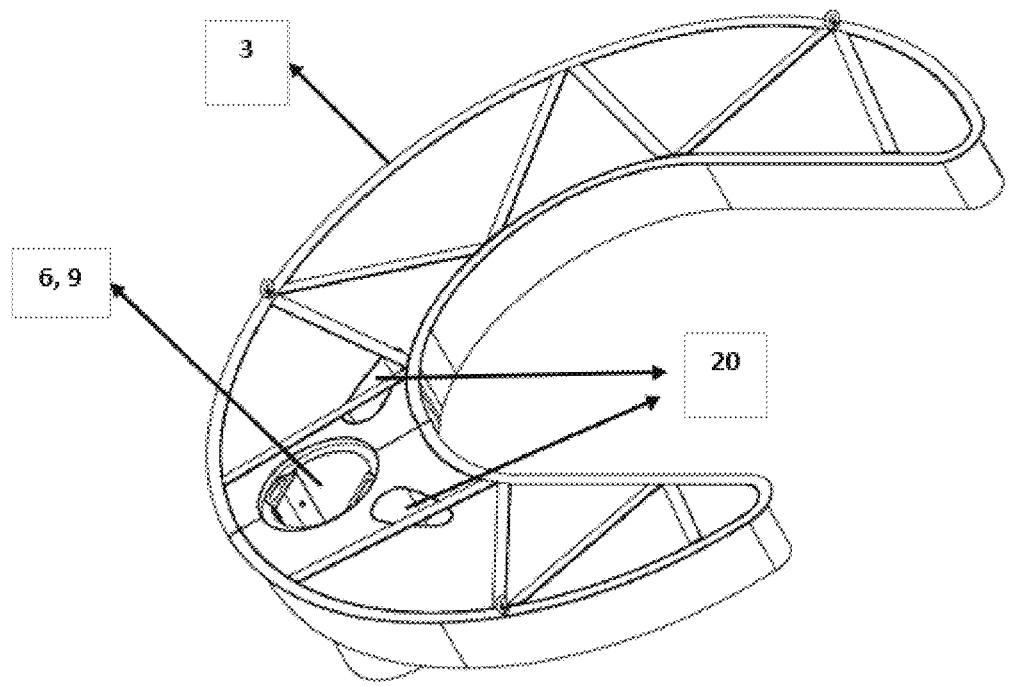
FIG. 5 shows a mold according to the present invention.

To perform the coating of the steel pan, it is proposed to use a mold 3 as exemplified in FIG. 5. As it can be seen, mold 3 has a preferably curvilinear box-like shape, whose cross-section shape corresponds to the profile to be printed on the pan bottom. In this modality, mold 3 has a profile shape 10 corresponding to the profile illustrated in FIG. 2. This curvilinear profile prevents the occurrence of stress concentrators in the concrete 5. In addition, it was found that the curved form also helps in reducing the head loss of the flow in this region closest to the impact region. However, the mold can be manufactured with corner shapes, having a trapezoidal or straight type shape slightly inclined at its edges.

Figure 6:
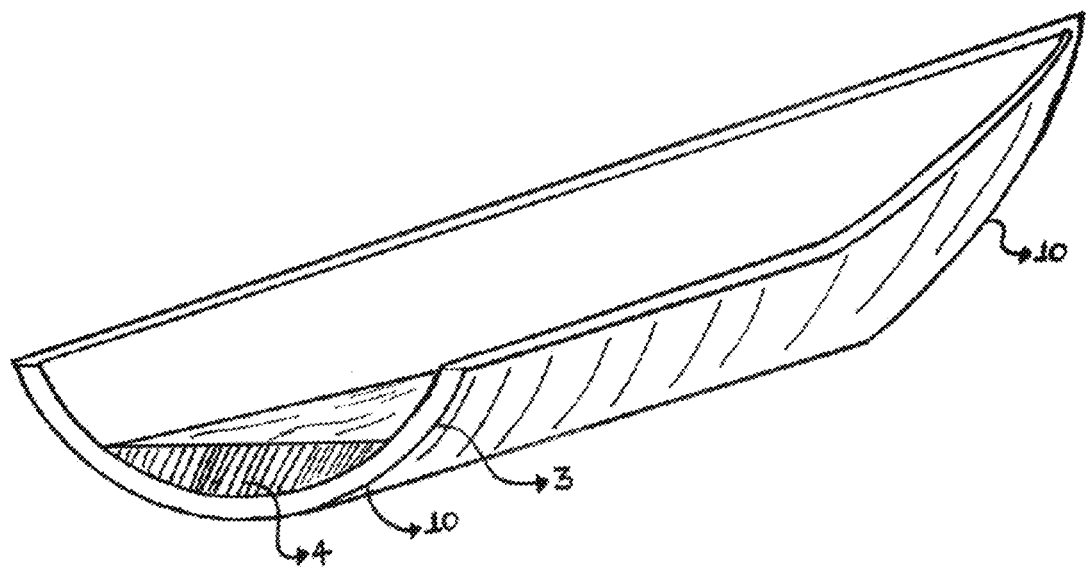
FIG. 6 shows the cross-section of one end of a mold according to the present invention.

Additionally, the mold has a thickness that varies along its length and that corresponds to the height variation that is desired to be applied to the bottom of the pan to improve the flow of the steel. FIG. 6 illustrates a cross-section of one end of the mold according to FIG. 5, where you can see the variation in its height.

Besides this, mold 3 comprises in its upper region a system for its fixation and support, and, in its lower region, a fixation system and hatches for concreting that will be described later.

At the beginning of the coating process, pan 1 is released for refractory reform.

Then the mold 3 is inserted from above, via a crane, and positioned over the bottom of the steel pan 1 to couple on the valve 2, so as to connect end points of the steel pan to the gate valve 2 system.

Mold 3 is then clamped to make the coating. Preferably, the mold 3 is attached to the valve seat 2 at the bottom of the steel pan 1.

Then, the refractory material 5 is applied to the bottom of the pan 1 and filling the space below the mold 3, so as to conform the coating with the characteristic profile according to the present invention. Preferably, the refractory material used is refractory concrete.

To ensure the formation of the desired profile, it is proposed to partially fill the interior of the mold 3 by forming a hollow or concave part with a load 4. Load 4 can be made with the concrete itself or even filled with the same material as the mold (steel, fiber, wood, etc.) as long as it provides sufficient weight to the structure. This action provides compensation for the buoyancy force of the concrete 5 being molded. Since mold 3 is made in box 10 format, i.e. hollow inside, the buoyancy generated would be too strong, which could break the mold clamping mechanism. Thus, it is necessary to calculate the partial volume to be filled 4, to ensure the balance of the weight forces of the mold in relation to the buoyancy force generated by the concrete.

Mold 3 has a slope to allow the formation of a profile that allows the steel to flow preferentially through it. The zero point of the mold, should be as far away from valve seat 2 as possible, allowing the steel to be captured from dead zones. From the zero point, we have a difference in depth with respect to valve seat 2. That is, there are two preferential levels of concrete height, generated by the profile of mold 3, this height difference is what allows the flow through the channel formed by mold 3, picking up steel from distant points in a region of greater thickness and generating a preferential flow towards valve 2 in a region of lesser thickness. The accelerated flow generated, produces a force that sustains the slag longer, avoiding the phenomenon of drainage.

To improve the application of the refractory material and the forming of the steel pan bottom, it is necessary to keep the mold clamped until the refractory material is formed. In this regard, the method according to the present invention provides the use of a clamping mechanism.

Figure 7:
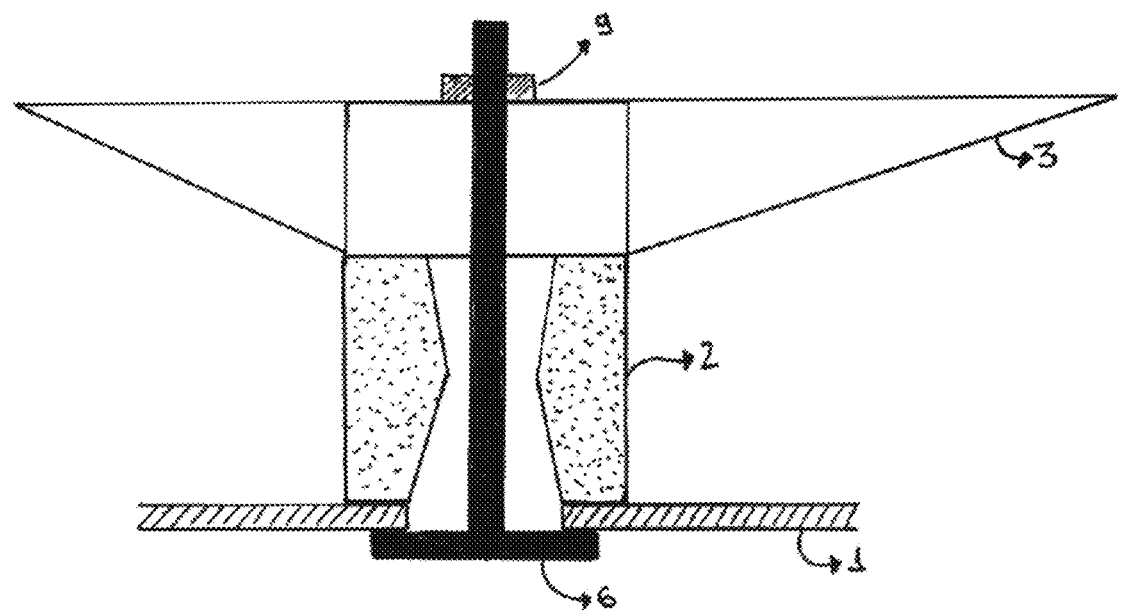
FIG. 7 shows a longitudinal section of the mold and a coupling system in the gate valve according to the present invention.

According to FIG. 7, mold 3 is clamped and locked into valve seat 2. In the center of the valve, a central pin 6 is inserted, which couples with the mold 3, which through a clamping system 9 will be locked to prevent the movement of the mold 3 during concreting.

Figure 8:
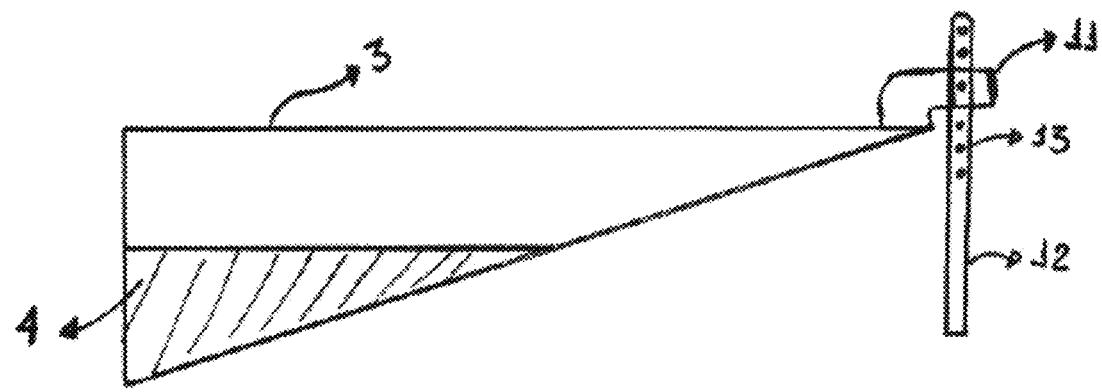
FIG. 8 shows a support system for the mold according to the present invention.

Preferably, as seen in FIG. 8, the mold has a fulcrum 11 to avoid stress on the mold tips 3 due to the weight generated by the internal balancing provided by the load 4. Preferably, the fulcrum 11 is formed simply by an extension or projection of the mold 3 body itself, with a central eyelet to allow passage of a support pin 12. However, the fulcrum can be formed by a part fitted or attached to the mold to allow clamping with the pin 12.

In this way, the support system allows the mold to remain level during load application. To allow for ideal height adjustment, the pin 12 has holes 13 that allow for adjustment during clamping and preparation for application of the refractory material, and then the mold is supported on the bottom of the pan.

When the concrete is finished, the support pin 12 is removed, taking care to vibrate the concrete, avoiding empty spaces. The height adjustment system can alternatively use any other system that allows height adjustment, such as a screw system, which rotates to raise the mold.

Thus, the present invention provides a method that allows a practical installation that can be applied directly to a steel pan bottom, enabling improvement during the steelmaking process.

Preferably, the coating background according to the present invention may include an anti-vortex system to prevent the formation of the vortex phenomenon. For this purpose, the mold 3, as seen in FIG. 5, can comprise open points or hatches 20, positioned near the opening corresponding to the valve seat, which allow the concrete to rise during concreting. More specifically, with the use of Hatch 20, during concreting, the concrete level increases at these open points, forming chamfers. At this stage, external vibrators can be used to ensure the homogenization of the concrete.

Thus, the pan bottom coating will comprise, in addition to the printed characteristic profile, the anti-vortex system formed by chamfers 14 and 15 near the valve seat, which generate a disturbance of the flow, thus preventing vortex formation.

As already mentioned, the vortex is a fluid dynamic phenomenon that can suck slag into the valve. The anti-vortex system can comprise at least one chamfer 14, with the system preferably comprising two chamfers 14 and 15. Thus, the present invention provides a method and a pan bottom coating capable of increasing steel flow and preventing the occurrence of the vortex phenomenon.

Figure 9:
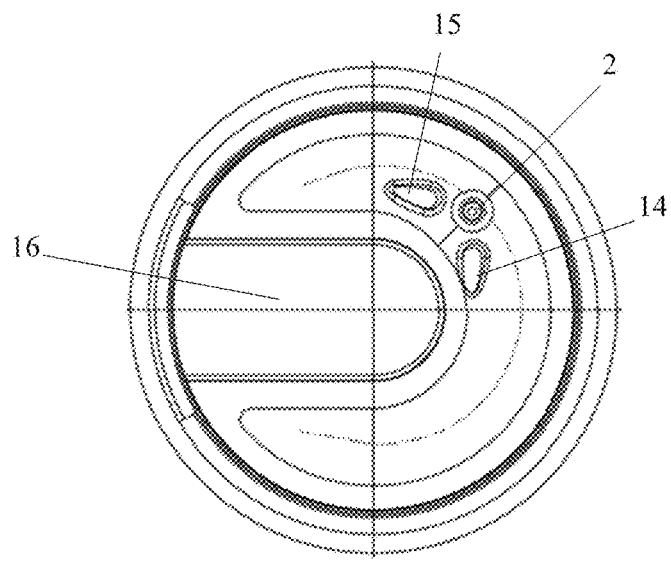
FIG. 9 shows another modality of the pan bottom according to the present invention.
Figure 10:
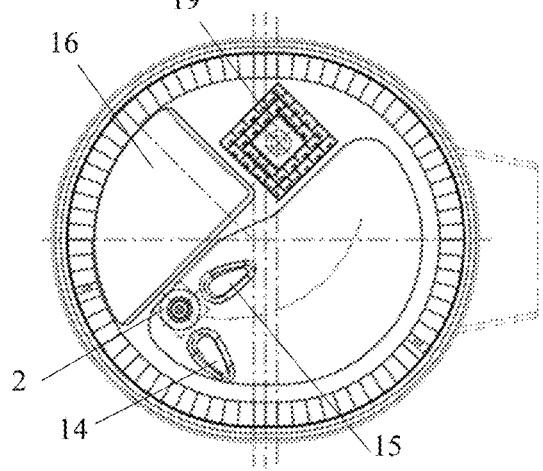
FIG. 10 shows another modality of the pan bottom according to the present invention.
Figure 11:
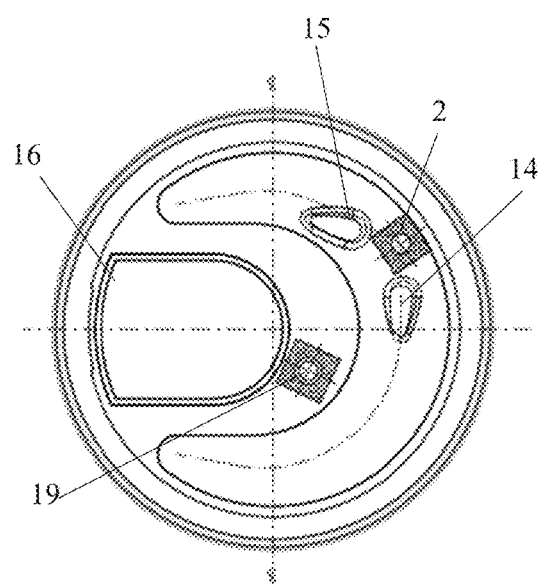
FIG. 11 shows another modality of the pan bottom according to the present invention.

FIGS. 9, 10 and 11 illustrate other modalities of the invention in which the coating method is applied different pan bottoms. Each coating bottom comprises an anti-vortex system, characteristic flow channels, and a pre-molded impact piece 16. The impact piece has a higher elevation than the bottom, assisting the flow of the steel. The piece has a convex edge, which facilitates the flow at the end of the pan and prevents breakage caused by sharp corners. The piece is previously made via molding in a special shape, cured and dried in a controlled environment. This operation aims to obtain a high-strength precast for use in the impact region (higher mechanical request).

It can be noted that each of the backgrounds shown in FIGS. 9 to 11 have different profiles, but are within the corresponding regions illustrated in FIG. 3. Thus, for the molding of each background, a mold with a different characteristic profile must be used, in order to create the desired profile in each situation.

Thus, the present invention provides a method for pan bottom coating and a mold that allows for simpler forming, either on-site or for manufacturing a prefabricated piece, having a shape capable of improving the steelmaking process.

Specifically, FIG. 11 illustrates a modality of the present invention applied to a pan bottom comprising an impact region 16, a valve seat 2, and a porous plug 19. In this configuration, the impact region 16 is positioned adjacent to the wall of the steel pan and valve seat 2 is positioned adjacent to one side of the impact region. The porous plug 19 is positioned close to the other side of the impact region. In this way, the profile used has an end closer to the porous plug 16 and extends to the valve seat 2. In addition, for better utilization, the profile has a large area in order to achieve the greatest number of dead zones. In this way, the steel can flow from the region near the porous plug 19 to the valve seat. To reduce vortexing effects, chamfers 14 and 15 are installed close to valve seat 2.

Figure 12:
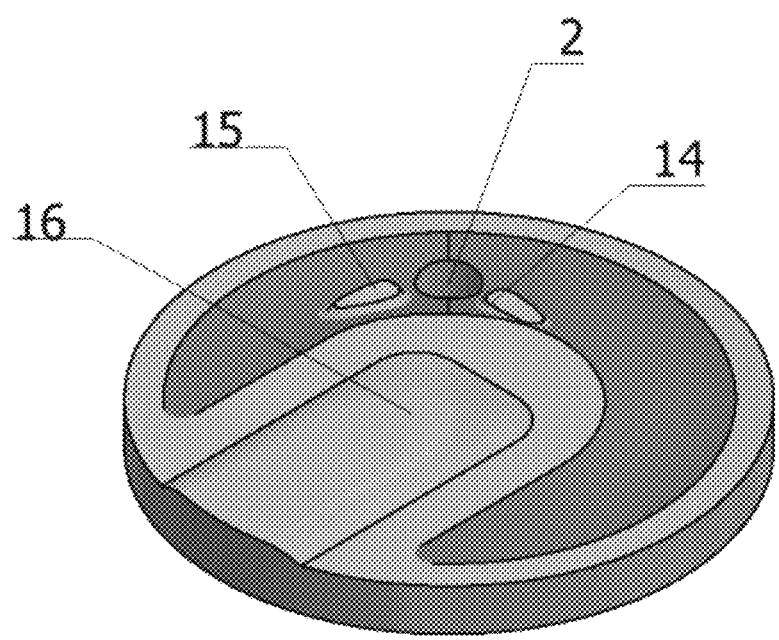
FIG. 12 illustrates a prefabricated piece according to a mode according to the present invention.

FIG. 12 illustrates a modality of the present invention applied to a steel pan configured such that the porous plug 19 is positioned adjacent to the impact region 16 and the valve seat 2 is close to a wall of the steel pan. In this case, the profile has a C-shape as in the first modality of the invention, where its ends are each positioned on one side of the impact region 16. It is also noted that the profile passes around the porous plug 19.

In addition to providing a simple and practical method for performing pan bottom coating at the installation site, the present invention makes it possible to manufacture prefabricated pieces. Mold 3 can be applied to a pre-molded piece that will have a printed profile and can be installed in the desired location.

Thus, it can be seen that the present invention enables a simple and practical method for improving the utilization of steel in pans with various configurations. Furthermore, it can be seen that the present invention is advantageous both in the application of the coating both at the installation site and in the manufacture of prefabricated pieces.

The advantage of the present invention was observed in experiments on a ⅛ scale physical model, which simulated the flow using water as a similar fluid. Note that the preferential flow generated by the curved channels, that at the end of the emptying of the water, a sustaining force was observed that prevented the collapse of the surface (drain phenomenon). Normal flow lines pull from various directions, including from the surface (slag). By creating the curved cavities at the bottom, you have a preferential acceleration from the periphery to valve seat 2. In the physical model experiments, using water as a steel-like fluid, the two configurations, straight bottom (current) and the bottom proposed by the present invention, were compared. By analyzing the water flowing through the valve, the moment of the formation of the drain phenomenon was observed. At this instant, the volume of water retained in the pan is marked. The background proposed by the present invention obtained a 75% reduction in the volume of water retained in the pan, which will impact the metal yield gain.

Another advantage of the present invention, relates to the type of surface wear during pan operation. One problem observed in another patent document described earlier, would be how to guarantee the same design until the end of the refractory coating life. The fact that it has curved cavities 10, provides a flowing preference in them, during the tests on the water model. This results in preferential wear in the cavities and thus always ensures a curved bottom shape. In other words, this type of solution proposed by the present invention tends to maintain the same function until the end of the coating's life.

Therefore, the present invention provides a method of steel pan bottom coating that allows installation capable of improving the steel manufacturing process and that is of practical installation and can be performed at the site of operation.

Numerous variations falling within the protective scope of the present invention are allowed. Thus, it is reinforced that the present invention is not limited to the particular configurations or embodiments described above.

The invention claimed is:

1. A steel ladle for liquid metal having a bottom formed by a coating of refractory material (5) and comprising:
   a ladle interior bottom surface;
   an impact region (16) on the interior bottom surface;
   an outlet valve (2) on the interior bottom surface having a valve seat;
   one of a straight or curved profile on the interior bottom surface formed by a mold (3), wherein the profile has ends, the profile extends from a region of greater thickness to a region of lesser thickness, and wherein the outlet valve (2) is positioned in the region of lesser thickness of the refractory bottom; and
   at least one chamfer (14,15) formed on the interior bottom surface around the valve seat (2), the at least one chamfer has sides, a top surface, and a bevel between the sides and the top surface, configured for liquid metal to flow over the top surface and around the sides at least one chamfer.

2. The steel ladle bottom according to claim 1, characterized in that the profile ends are located around the impact region.

3. The steel ladle bottom according to claim 1, wherein, the profile extends from two ends positioned in the region of greater thickness and distant from the outlet valve (2).

4. The steel ladle bottom according to claim 1, wherein said profile is curved.

5. The steel ladle bottom according to claim 1, wherein said profile is C-shaped.

6. The steel ladle bottom according to claim 5, wherein each profile is positioned on one side of the impact region.

7. The steel ladle bottom according to claim 1, wherein said impact region has a convex edge.

* * * * *